(12) United States Patent
Beck

(10) Patent No.: US 6,553,761 B2
(45) Date of Patent: Apr. 29, 2003

(54) SUSPENSION SYSTEM FOR MOTOR VEHICLES

(75) Inventor: Hubert Beck, Eitorf (DE)

(73) Assignee: Mannesmann Sachs AG, Eitorf (DE)

( * ) Notice: Subject to any disclaimer, the term of this patent is extended or adjusted under 35 U.S.C. 154(b) by 0 days.

(21) Appl. No.: 09/827,477

(22) Filed: Apr. 5, 2001

(65) Prior Publication Data

US 2001/0032462 A1 Oct. 25, 2001

(30) Foreign Application Priority Data

Apr. 20, 2000 (DE) .......................... 100 19 531

(51) Int. Cl.⁷ .................... F16D 31/02; B60G 17/04
(52) U.S. Cl. .................. 60/477; 280/5.514; 280/6.157
(58) Field of Search .............. 60/477, 481; 280/DIG. 1, 280/5.514, 6.157, 6.158; 267/64.16

(56) References Cited

U.S. PATENT DOCUMENTS 4,079,963 A * 3/1978 Siorek .................... 267/64.16
4,593,920 A * 6/1986 Natsume et al. ......... 280/6.157
4,700,812 A * 10/1987 Moser .................... 188/1.11 E

* cited by examiner

Primary Examiner—Edward K. Look
Assistant Examiner—Thomas E. Lazo
(74) Attorney, Agent, or Firm—Cohen, Pontani, Lieberman & Pavane

(57) ABSTRACT

A suspension system for motor vehicles includes level regulation for adjusting a predetermined height of the vehicle body. At least one piston-cylinder unit of the suspension system includes a work cylinder, a piston rod and a damping piston having damping valves. A pump is arranged between an oil reservoir and the piston-cylinder unit via corresponding inlet and outlet lines. The pump comprises a pump piston and a drive unit arranged so that a pressure of the piston-cylinder unit acts on a delivery side and on a driving side of the pump piston.

18 Claims, 3 Drawing Sheets

SUSPENSION SYSTEM FOR MOTOR VEHICLES

BACKGROUND OF THE INVENTION

1. Field of the Invention

The present invention relates to a suspension system for motor vehicles with level regulation for adjusting a predetermined height of the vehicle body which includes at least one piston-cylinder unit with a work cylinder, a piston rod, a damping piston having damping valves, and a pump for an oil reservoir and corresponding inlet and outlet lines between the oil reservoir and the piston-cylinder unit.

2. Description of the Related Art

Suspensions with automatic level regulation for motor vehicles are known, for example, from German reference DE 32 12 433 A1 wherein the suspension units of the vehicle wheels are supplied from a central oil reservoir via correspondingly open hydraulic lines. Corresponding actuating valves connect the suspension units with the oil reservoir and are supplied with an appropriate amount of oil from the oil reservoir by a central pump. A flow regulator and a height sensor act in the oil circuit when needed to adjust the vehicle body to an appropriate height and the pump is activated in response to this flow regulator. A disadvantage in a suspension unit of this type is that hydraulic lines needed for the forward and reverse flow and the pressureless oil reservoirs require maintenance in that the filling level of the damping medium must be constantly monitored. Further, suspension units of this type cannot be retrofitted in an existing vehicle.

SUMMARY OF THE INVENTION

It is an object of the invention to provide a suspension system with level regulation which can be controlled and sensed electrically and which is also easily retrofitted in existing motor vehicles.

According to the present invention, the object is met in that a pump comprising a pump piston and a drive unit is arranged such that the pump piston is acted upon on the delivery side and on the driving side by the pressure of the piston-cylinder unit.

In the present invention, the pump piston itself provides for tightness by a close sliding fit. A slight oil leakage that occurs through the sliding fit is guided back to the oil reservoir again.

Since there are no seals acting on the pump piston, startup problems which generally occur from dynamic seals are minor even after long shelf times and with high internal pressure in the device.

The pump piston has a sliding fit relative to the pump cylinder. In this respect, absolute tightness is not required for the piston in the pump cylinder.

In another embodiment, the drive unit is provided with a cam and includes a pressure bearing for supporting a shaft carrying the cam. In this respect, the pressure in the oil reservoir is supported by the pressure bearing of the shaft when the cam is loaded toward the drive. This pressure bearing may comprise a ball bearing, thereby providing a low-friction support. Coated bearing bushes or other friction-reducing bearings may be used on the opposite side of the cam to ensure the lowest possible friction in the drive unit.

According to another embodiment, the pump is sealed relative to the piston-cylinder unit and relative to the atmosphere. Seals which seal statically and seal the housing parts relative to one another may be used for this purpose. This ensures lifetime durability of sealing.

According to yet a further embodiment, the shaft carrying the cam has at least one seal which seals toward the atmosphere.

In another embodiment, the shaft of the cam is sealed toward the atmosphere on both sides. This embodiment may be used when the shaft of the drive unit is to be loaded on both sides simultaneously so that a pressure bearing may be dispensed with.

The diameter of the shaft is approximately identical on both sides of the cam.

According to a further embodiment, a flow connection may extend from the drive side of the pump piston to the oil reservoir. In this respect, the pump piston may be pressure-compensated so that special piston ring seals may be dispensed with and so that leakage oil can easily be guided back to the oil reservoir.

The cam may be surrounded by a sliding ring which is contacted by the pump piston at the end face.

Furthermore, the sliding ring may comprise an external part of a rolling bearing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
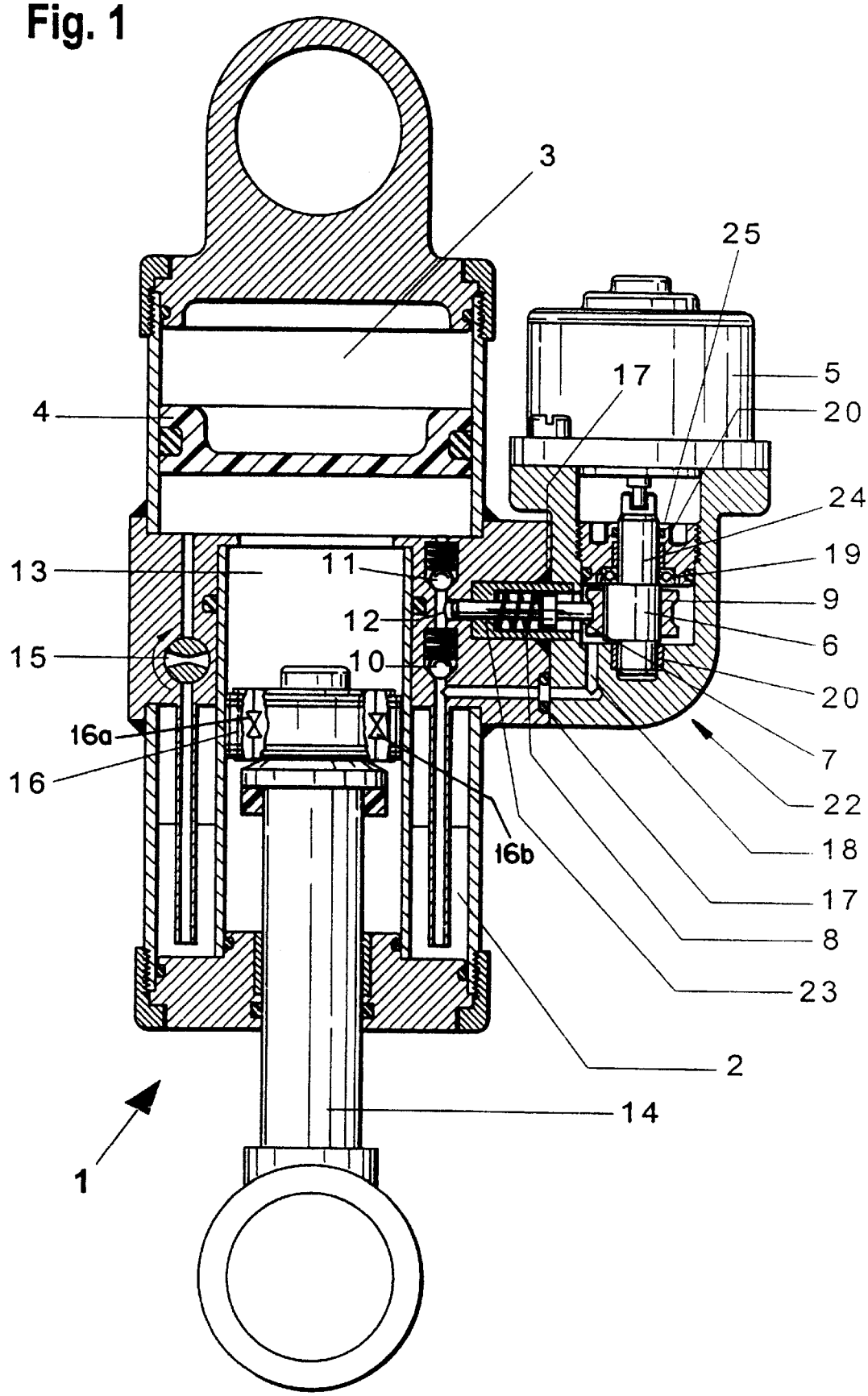
FIG. 1 is a longitudinal sectional view of a suspension system for motor vehicles with level regulation according to an embodiment of the present invention.

FIG. 1 shows a piston-cylinder unit 1 according to an embodiment of the present invention in which an oil reservoir 2 and a pneumatic or gas spring volume 3 are integrated. Oil and gas are separated from each other in the gas spring volume 3 by a separating element 4 which is movable in a longitudinal direction of the piston cylinder unit 1. A drive unit 5 is connected to an oil pump 22 which is connected between the oil reservoir 2 and a high pressure area 13 of the piston-cylinder unit 1. When the drive unit 5 is switched on, a pump piston 7 of the oil pump 22 is set in reciprocating axial movement by the rotating movement of a cam 6. A restoring force is exerted on the pump piston 7 via a spring 8. A sliding ring 9 which reduces the point load of the pump piston 7 to a more favorable, i.e., larger, pressure area is associated with the cam 6. Therefore, the cam 6 rotates inside the fixed sliding ring 9.

Oil from the oil reservoir 2 is delivered from the pump space 12 to the high-pressure area 13 by the pump piston 7 via an inlet valve 10 and an outlet valve 11. As the oil is pumped into the high pressure area 13, the gas spring volume 3 is gradually compressed and accordingly acts on the end face of the piston rod 14. As long as the drive unit 5 is operating, the piston rod 14 is pushed outward until a predetermined body height of a vehicle is reached. The drive unit 5 may be switched off, for example, by an external path sensor. The extension force of the piston rod 14 may be reduced by actuating a bleeder valve 15 which is arranged between the oil reservoir 2 and the high pressure area 3. The reduction occurs when the vehicle is unloaded.

While the vehicle is being driven, a damping piston 16 provides for the damping of the vehicle with its damping valves 16a, 16b which are known from the prior art and shown schematically in FIG. 1.

The drive unit 5 with its housing is sealed relative to the atmosphere and relative to the piston-cylinder unit 1 by static seals 17. The pump piston 7 moves in a pump cylinder 23 without special additional seals for reducing friction so that the startup behavior of the drive unit 5 is facilitated and has lifetime durability due to small variations in pressure. Because there are no additional seals between the pump piston 7 and the pump cylinder 23, a pressure in the piston cylinder unit 1 acts on both the delivery side of the pump piston 7 in pump space 12 and the drive side of the pump piston 7, i.e., the side of the pump piston 7 which interacts with the drive unit 5.

A leakage oil flow is deliberately permitted by providing a sliding fit between the pump piston 7 and the pump cylinder 23. The leakage oil is subsequently returned to the oil reservoir 2 on the rear side of the pump piston 7 via a flow connection 18. Apart from the reduced friction of the pump piston 7 relative to the pump cylinder 23, the leakage oil also provides a permanent lubrication of the moving parts such as the pump piston 7 and cam 6.

The pressure occurring additionally on the drive side of the pump piston 7 is reduced by the pressure bearing 19 and the seal 25 toward the atmosphere. The shaft 24 is supported on the side of the cam 6 located opposite from the drive unit 5 by coated bearing bushings 20 which have a friction reducing surface. The coated bearing bushings may, for example, be Teflon-coated.

Figure 2:
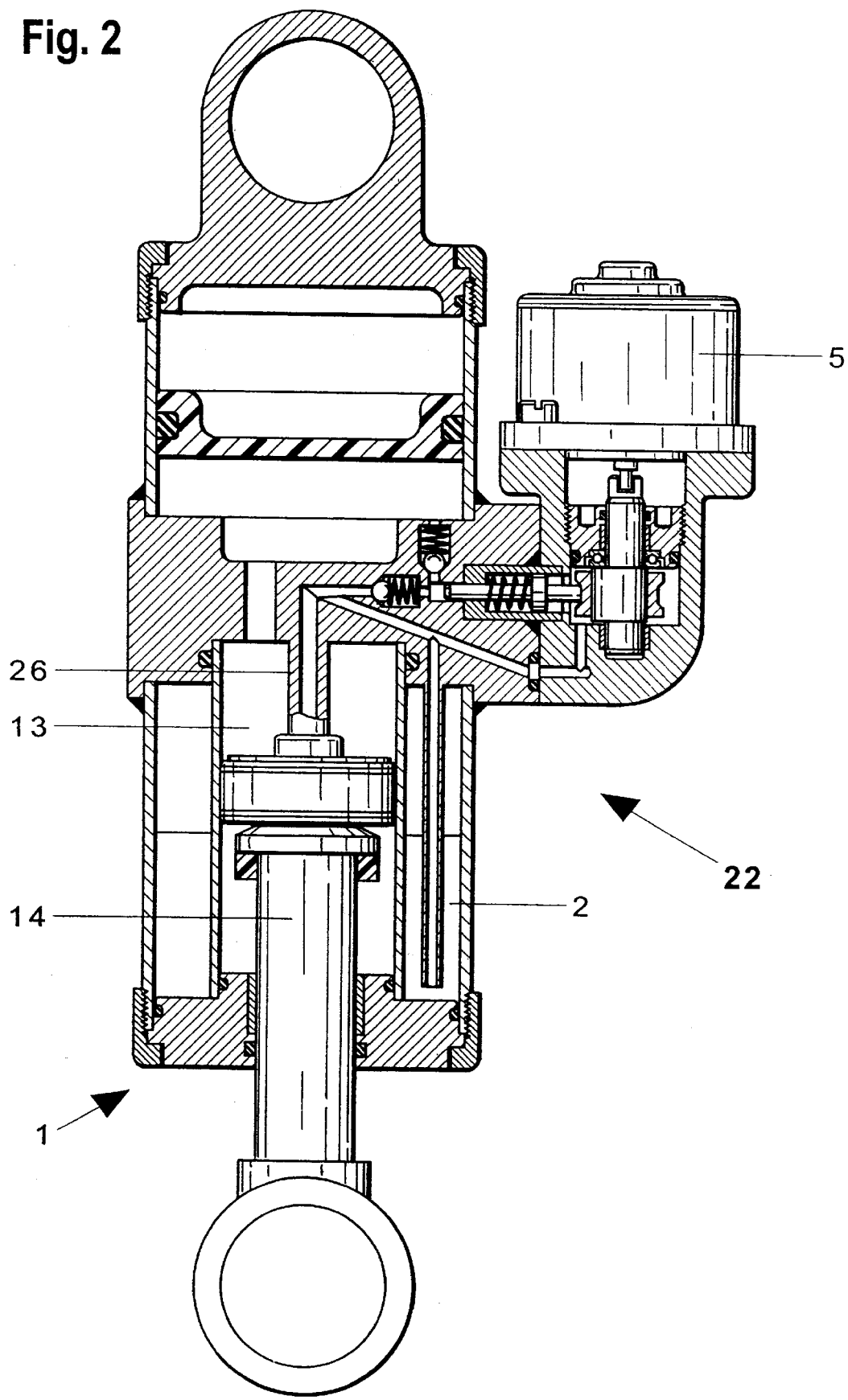
FIG. 2 is a longitudinal sectional view of another embodiment form of a suspension system for motor vehicles according to the present invention with self-pumping level regulation and an additional drive unit.

FIG. 2 shows another embodiment form of a suspension system for motor vehicles. In this embodiment, the piston-cylinder unit 1 is provided as a self-pumping hydropneumatic shock strut. The pump 22a of this embodiment is connected with a pump rod 26 for the regulation of the level of the vehicle body. The pump rod 26 is arranged in the hollow piston rod 14 as is known from the prior art. This pump rod 26 is provided with a mechanical pumping and outlet device. Oil is delivered from the oil reservoir 2 to the high-pressure area 13 via the drive unit 5 in the vehicle stand. The suspension system shown in FIG. 2 operates in essentially the same way as that shown in FIG. 1.

Figure 3:
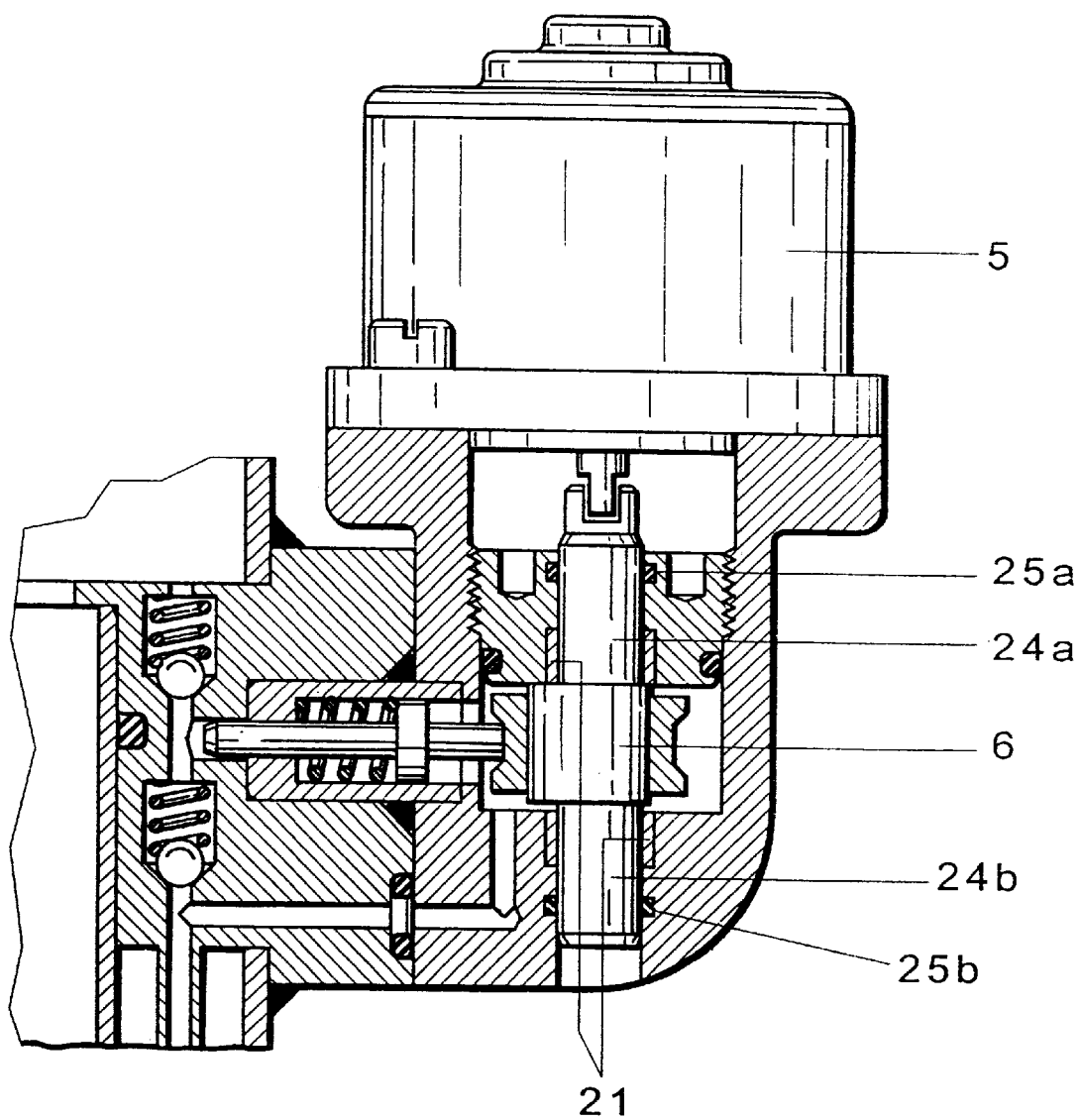
FIG. 3 is a sectional view of an embodiment of a drive unit according to FIGS. 1 and 2 in which both sides of the shaft of the drive unit are exposed to the atmosphere.

FIG. 3 shows a drive unit 5a in which both shaft sides 24a, 24b of a shaft 24' of the cam 6 face the atmosphere. The shaft sides 24a, 24b are guided in the housing via sliding bushings 21. Seals 25a and 25b seal the shaft 24 relative to the atmosphere. Pressure equilibrium is given by approximately identical shaft diameters of the shaft sides 24a and 24b, so that the shaft 24' of the drive unit 5a in FIG. 3 may be arranged without an axially acting pressure bearing.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A suspension system for a motor vehicle with level regulation for adjusting a predetermined height of a vehicle body, comprising:

at least one piston-cylinder unit provided with a work cylinder, a piston rod axially movably arranged in said work cylinder, and a damping piston connected to said piston rod;

an oil reservoir; and a pump connected between said oil reservoir and said piston-cylinder unit via corresponding inlet and outlet lines, wherein said pump comprises a pump piston and a drive unit operatively arranged for effecting a reciprocating axial movement of said pump piston, said drive unit being electrically controlled, wherein said pump piston has a drive side connected to said drive unit and a delivery side connected to said inlet and outlet lines, and wherein said pump piston is arranged so that the pressure of said piston-cylinder unit acts on said delivery side and on said driving side of said pump piston.

2. The suspension system of claim 1, wherein said pump further comprises a pump cylinder and said pump piston is arranged with a sliding fit relative to said pump cylinder.

3. The suspension system of claim 1, wherein said drive unit comprises a shaft carrying a cam and a pressure bearing for supporting said shaft.

4. The suspension system of claim 1, wherein said pump is sealed relative to said piston-cylinder unit and relative to said atmosphere.

5. The suspension system of claim 4, wherein said drive unit comprises a shaft carrying a cam and said shaft has at least one seal which seals said pump toward the atmosphere.

6. The suspension system of claim 1, wherein said drive unit comprises a shaft carrying a cam, said shaft having shaft sides on opposing sides of said cam and wherein both of said shaft sides are sealed toward the atmosphere.

7. The suspension system of claim 6, wherein diameters of said shaft sides are approximately the same.

8. The suspension system of claim 1, further comprising a flow connection extending from a drive side of the pump piston to said oil reservoir.

9. The suspension system of claim 1, wherein said drive unit comprises a cam connected to a shaft and a sliding ring surrounding said cam, said sliding ring contacting an end face of said piston pump.

10. The suspension system of claim 9, wherein said sliding ring is an external part of a rolling bearing.

11. A suspension system for a motor vehicle with level regulation for adjusting a predetermined height of a vehicle body, comprising:

at least one piston-cylinder unit provided with a work cylinder, a piston rod axially movably arranged in said work cylinder, and a damping piston connected to said piston rod;

an oil reservoir; and a pump connected between said oil reservoir and said piston-cylinder unit via corresponding inlet and outlet lines, wherein said pump comprises a pump piston and a drive unit operatively arranged for effecting a reciprocating axial movement of said pump piston, wherein said pump piston has a drive side connected to said drive unit and a delivery side connected to said inlet and outlet lines, and wherein said pump piston is arranged so that the pressure of said piston-cylinder unit acts on said delivery side and on said driving side of said pump piston, wherein said drive unit comprises a shaft carrying a cam and a pressure bearing for supporting said shaft.

12. A suspension system for a motor vehicle with level regulation for adjusting a predetermined height of a vehicle body, comprising:

at least one piston-cylinder unit provided with a work cylinder, a piston rod axially movably arranged in said work cylinder, and a damping piston connected to said piston rod;

an oil reservoir; and a pump connected between said oil reservoir and said piston-cylinder unit via corresponding inlet and outlet lines, wherein said pump comprises a pump piston and a drive unit operatively arranged for effecting a reciprocating axial movement of said pump piston, wherein said pump piston has a drive side connected to said drive unit and a delivery side connected to said inlet and outlet lines, and wherein said pump piston is arranged so that the pressure of said piston-cylinder unit acts on said delivery side and on said driving side of said pump piston, wherein said pump is sealed relative to said piston-cylinder unit and relative to an atmosphere external to said piston-cylinder unit.

13. The suspension system of claim 12, wherein said drive unit comprises a shaft carrying a cam and said shaft has at least one seal which seals said pump toward the atmosphere.

14. A suspension system for a motor vehicle with level regulation for adjusting a predetermined height of a vehicle body, comprising:

at least one piston-cylinder unit provided with a work cylinder, a piston rod axially movably arranged in said work cylinder, and a damping piston connected to said piston rod;

an oil reservoir; and a pump connected between said oil reservoir and said piston-cylinder unit via corresponding inlet and outlet lines, wherein said pump comprises a pump piston and a drive unit operatively arranged for effecting a reciprocating axial movement of said pump piston, wherein said pump piston has a drive side connected to said drive unit and a delivery side connected to said inlet and outlet lines, and wherein said pump piston is arranged so that the pressure of said piston-cylinder unit acts on said delivery side and on said driving side of said pump piston, wherein said drive unit comprises a shaft carrying a cam, said shaft having shaft sides on opposing sides of said cam and wherein both of said shaft sides are sealed toward the atmosphere.

15. The suspension system of claim 14, wherein diameters of said shaft sides are approximately the same.

16. A suspension system for a motor vehicle with level regulation for adjusting a predetermined height of a vehicle body, comprising:

at least one piston-cylinder unit provided with a work cylinder, a piston rod axially movably arranged in said work cylinder, and a damping piston connected to said piston rod;

an oil reservoir;

a pump connected between said oil reservoir and said piston-cylinder unit via corresponding inlet and outlet lines, wherein said pump comprises a pump piston and a drive unit operatively arranged for effecting a reciprocating axial movement of said pump piston, wherein said pump piston has a drive side connected to said drive unit and a delivery side connected to said inlet and outlet lines, and wherein said pump piston is arranged so that the pressure of said piston-cylinder unit acts on said delivery side and on said driving side of said pump piston; and a flow connection extending from a drive side of the pump piston to said oil reservoir.

17. A suspension system for a motor vehicle with level regulation for adjusting a predetermined height of a vehicle body, comprising:

at least one piston-cylinder unit provided with a work cylinder, a piston rod axially movably arranged in said work cylinder, and a damping piston connected to said piston rod;

an oil reservoir; and a pump connected between said oil reservoir and said piston-cylinder unit via corresponding inlet and outlet lines, wherein said pump comprises a pump piston and a drive unit operatively arranged for effecting a reciprocating axial movement of said pump piston, wherein said pump piston has a drive side connected to said drive unit and a delivery side connected to said inlet and outlet lines, and wherein said pump piston is arranged so that the pressure of said piston-cylinder unit acts on said delivery side and on said driving side of said pump piston, wherein said drive unit comprises a cam connected to a shaft and a sliding ring surrounding said cam, said sliding ring contacting an end face of said piston pump.

18. The suspension system of claim 17, wherein said sliding ring is an external part of a rolling bearing.

* * * * *